R. J. ARENS.
PROCESS OF MANUFACTURING TIRE CASINGS.
APPLICATION FILED OCT. 31, 1917.
1,274,496.
Patented Aug. 6, 1918.
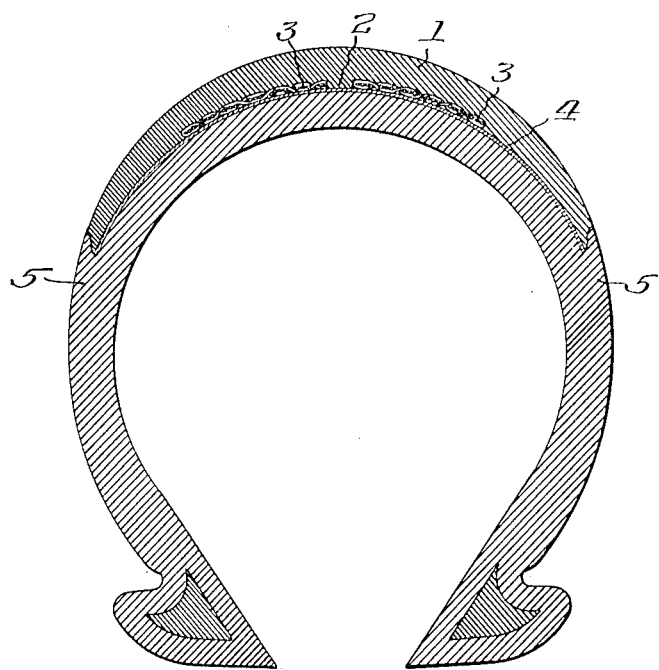
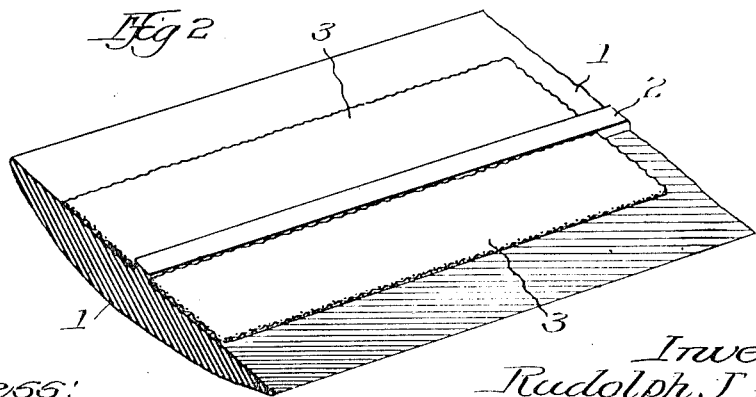

UNITED STATES PATENT OFFICE.

RUDOLPH J. ARENS, OF AKRON, OHIO, ASSIGNOR TO THE FIRESTONE TIRE & RUBBER COMPANY, OF AKRON, OHIO, A CORPORATION OF OHIO.

PROCESS OF MANUFACTURING TIRE-CASINGS.

1,274,496.

Specification of Letters Patent.

Patented Aug. 6, 1918.

Application filed October 31, 1917. Serial No. 199,573.

*To all whom it may concern:*

Be it known that I, RUDOLPH J. ARENS, a subject of the King of Great Britain, residing at Akron, in the county of Summit and State of Ohio, have invented certain new and useful Improvements in Processes of Manufacturing Tire-Casings, of which the following is a specification.

The object of this invention is to decrease the loss of tires through what is known as "mold pinching," which occurs during the vulcanization of the tire, and is a constant source of loss to the manufacturer. It is also an object to increase the length of the life of tires by providing an improved breaker strip which may be applied to the tire in such a manner as will prevent defects in the tire caused by a slight "mold-pinching," or the pinching up of the center of the breaker strip by the mold, which can not be detected in the final inspection of the tire.

When tire molds are pressed together in the process of vulcanization surplus rubber is forced up through the opening between the two sides of the mold. In cases where the strip is not pinched up enough to show on the surface of the tire tread on the final inspection, it cannot be discovered until the tire tread is worn down sufficiently to bring the "mold-pinch" on the fabric to the surface, at which time water enters into the fabric of the tire causing it to rot and its life is greatly shortened. This defect is cured by my improved breaker strip as shown.

These and other objects will appear from the accompanying specifications and the drawings forming a part thereof, in which:

Figure 1 is a cross section of a tire supplied with my improved breaker strip, and Fig. 2 is a view of a section of a tread strip before being applied to a tire, showing a fragment of one of my improved breaker strips attached to same.

In the drawings 1 represents a tire tread, which may be made in any well-known manner and which is formed with a small rib 2 in the center of its under side and extending its entire length. This rib may be formed either by a slot in the die which makes the tread, if the tread is tubed, or it may be made separately and attached to the tread. The breaker strip 3 is in two parts, being composed of strips of loosely woven rubberized fabric, which are applied to the underside of the tread 1 on each side of the rib 2, after which the tread is applied over a cushion of rubber 4 which has been previously applied to the main carcass 5.

By making the breaker strip in two parts slightly separated in the center any flow of the tread stock toward the spaces between the two halves of the mold during vulcanization will cause the two halves of the breaker strip to approach each other slightly and there will be no tendency to wrinkle or buckle at this point as was the case where the breaker strip was in one piece extending over the crown of the tire. The provision of the rib in the center of the tread affords an accurate means of positioning the two edges of the breaker strips, as well as affording an additional cushion medium at the point of contact of the tire with the ground. Other methods of spacing the two halves of the breaker strip may be designed, but the one shown herein is preferred.

A further advantage derived from the application of the breaker and tread together is that there is less tendency for unequal stretching of the tread portion while it is being placed on the partially finished casing, as the fabric will distribute any stretch more evenly throughout the whole tread than if the tread were stretched on the casing after the breaker had been applied to the tire.

Various changes and modifications may be made in the method shown without departing from the broad features of the invention or sacrificing any of its benefits.

I claim:

1. The process of manufacturing tire casings comprising forming the carcass and the tread, providing a positioning formation on one of said parts, applying a breaker strip to the tire in two parallel strips, and positioning and spacing said strips by means of said formation.

2. The process of manufacturing tire casings comprising forming the carcass and the tread, providing a positioning formation on the tread, applying a breaker strip composed of two parallel strips of fabric to the tread at the sides of and adjacent to said formation, and applying the tread and breaker strip to the carcass.

3. The process of manufacturing tire casings, comprising forming the carcass and the tread, providing a rib longitudinally of the tread, applying a breaker strip composed of two parallel strips of fabric to the tread at the sides of and adjacent to said rib, and applying the tread and breaker strip to the carcass.

4. The process of manufacturing tire casings, comprising forming the carcass and the tread, providing a longitudinal rib centrally of the tread, applying a breaker strip composed of two parallel strips of fabric to the tread at the sides of and adjacent to said rib, and applying the tread and breaker strips centrally of the carcass.

5. The process of manufacturing tire casings, comprising forming the carcass and the tread, providing a longitudinal rib centrally of one of the said portions and applying a breaker strip composed of two parallel strips of fabric to the portion having the rib at the sides of said rib and adjacent thereto.

RUDOLPH J. ARENS.